United States Patent
Luecking et al.

(10) Patent No.: US 9,025,786 B2
(45) Date of Patent: May 5, 2015

(54) ACTIVE NOISE CONTROL SYSTEM FOR EXHAUST SYSTEMS AND METHOD FOR CONTROLLING THE SAME

(75) Inventors: Christof Luecking, Wetter (DE); Andre Mengel, Bad Boll (DE)

(73) Assignee: Eberspaecher Exhaust Technology GmbH & Co. KG, Neunkirchen (DE)

( * ) Notice: Subject to any disclaimer, the term of this patent is extended or adjusted under 35 U.S.C. 154(b) by 251 days.

(21) Appl. No.: 13/485,520

(22) Filed: May 31, 2012

(65) Prior Publication Data

US 2012/0308023 A1 Dec. 6, 2012

(30) Foreign Application Priority Data

Jun. 1, 2011 (DE) .......................... 10 2011 103 211

(51) Int. Cl.
*G10K 11/16* (2006.01)
*F01N 1/06* (2006.01)
(Continued)

(52) U.S. Cl.
CPC ............ *F01N 1/065* (2013.01); *F01N 2390/00* (2013.01); *F16L 55/0333* (2013.01); *G10K 11/178* (2013.01); *G10K 2210/12822* (2013.01); *G10K 2210/3033* (2013.01)

(58) Field of Classification Search
CPC ... F01N 1/065; F01N 2390/00; G10K 11/178; G10K 2210/3033; G10K 2210/12822; F16L 55/0333
USPC ......... 381/71.5, 71.1, 71.4, 71.7, 71.8, 71.11, 381/86, 94.1, 56
See application file for complete search history.

(56) References Cited

U.S. PATENT DOCUMENTS

| | | | |
|---|---|---|---|
| 4,177,874 A | 12/1979 | Angelini et al. | |
| 5,022,082 A | 6/1991 | Eriksson et al. | |

(Continued)

FOREIGN PATENT DOCUMENTS

| | | | |
|---|---|---|---|
| DE | 19543409 A1 | 6/1996 | |
| DE | 19713182 A1 | 10/1998 | |

(Continued)

OTHER PUBLICATIONS

Wikipedia: Controller Area Network, Version dated May 23, 2011, researched on Mar. 14, 2002; Available from http://de.wikipedia.org/w/index.php?title=Controller_Area_Network&oldid=89170721; German and English Version.

(Continued)

*Primary Examiner* — Paul S Kim
(74) *Attorney, Agent, or Firm* — Morris & Kamlay LLP

(57) ABSTRACT

An active noise control system for exhaust systems of a combustion engine operated vehicle comprises an anti-sound control connectable to an engine control of the vehicle and a loudspeaker connected to the control for receiving control signals and designed for generating an anti-sound in a sound generator, fluidically connectable to the exhaust system. In the control, at least two curves are stored in order to cancel airborne sound conducted in the exhaust system through outputting the signal to the loudspeaker. The curves cover different temperature ranges of the exhaust gas, which temperature ranges overlap one another by pairs or directly adjoin one another. The control is furthermore designed to select a curve suitable for a respective temperature of the exhaust gas conducted in the exhaust system from the available curves by means of signals output by the engine control and output signals to the loudspeaker making use of this curve.

24 Claims, 3 Drawing Sheets

(51) Int. Cl.
*F16L 55/033* (2006.01)
*G10K 11/178* (2006.01)

(56) References Cited

U.S. PATENT DOCUMENTS

| | | | |
|---|---|---|---|
| 5,229,556 A | 7/1993 | Geddes | |
| 5,233,137 A | 8/1993 | Geddes | |
| 5,325,438 A | 6/1994 | Browning et al. | |
| 5,336,856 A | 8/1994 | Krider et al. | |
| 5,343,533 A | 8/1994 | Geddes | |
| 5,380,190 A | 1/1995 | Kumagai | |
| 5,432,857 A | 7/1995 | Geddes | |
| 5,571,239 A | 11/1996 | Kameda et al. | |
| 5,600,106 A | 2/1997 | Langley | |
| 5,619,020 A | 4/1997 | Jones et al. | |
| 5,703,337 A | 12/1997 | Geisenberger | |
| 5,930,993 A | 8/1999 | Kammann et al. | |
| 6,050,086 A | 4/2000 | Ishizuka et al. | |
| 2004/0011340 A1 | 1/2004 | Hosny et al. | |
| 2006/0037808 A1 | 2/2006 | Kruger et al. | |
| 2006/0130919 A1 | 6/2006 | Ehmann et al. | |
| 2006/0236973 A1 | 10/2006 | Seibt et al. | |
| 2008/0053747 A1 | 3/2008 | Krueger et al. | |
| 2009/0058633 A1 | 3/2009 | Luo et al. | |
| 2009/0255754 A1 | 10/2009 | Kruger et al. | |
| 2010/0223907 A1 | 9/2010 | Walde et al. | |
| 2011/0000734 A1 | 1/2011 | Kruger et al. | |

FOREIGN PATENT DOCUMENTS

| | | | |
|---|---|---|---|
| DE | 19751596 | | 6/1999 |
| DE | 19807054 C2 | | 5/2002 |
| DE | 102009031848 | | 1/2011 |
| DE | 102009031848 A1 | | 1/2011 |
| EP | 481450 A1 | | 4/1992 |
| EP | 0373188 | | 12/1993 |
| EP | 0674097 | | 9/1995 |
| EP | 0916817 | | 5/1999 |
| EP | 1055804 | | 11/2000 |
| EP | 1329627 A2 | | 7/2003 |
| EP | 1717433 A2 | | 11/2006 |
| EP | 2072769 | | 6/2009 |
| EP | 2072769 A1 | | 6/2009 |
| EP | 2226482 A1 | | 9/2010 |
| JP | 05-088686 | | 4/1993 |
| JP | 05088686 A | * | 4/1993 |
| JP | 10-011076 | | 1/1998 |
| JP | 2001280113 A | | 10/2001 |
| JP | 3250001 B2 | | 1/2002 |

OTHER PUBLICATIONS

Japanese Patent Office, Office Action in Patent Application No. 2012-125787, mailed Jul. 9, 2013.

Garabedian, et al., "Active Noise Control: Dream or Reality for Passenger Cars?", SAE Technical Paper, Mar. 5, 2001.

* cited by examiner

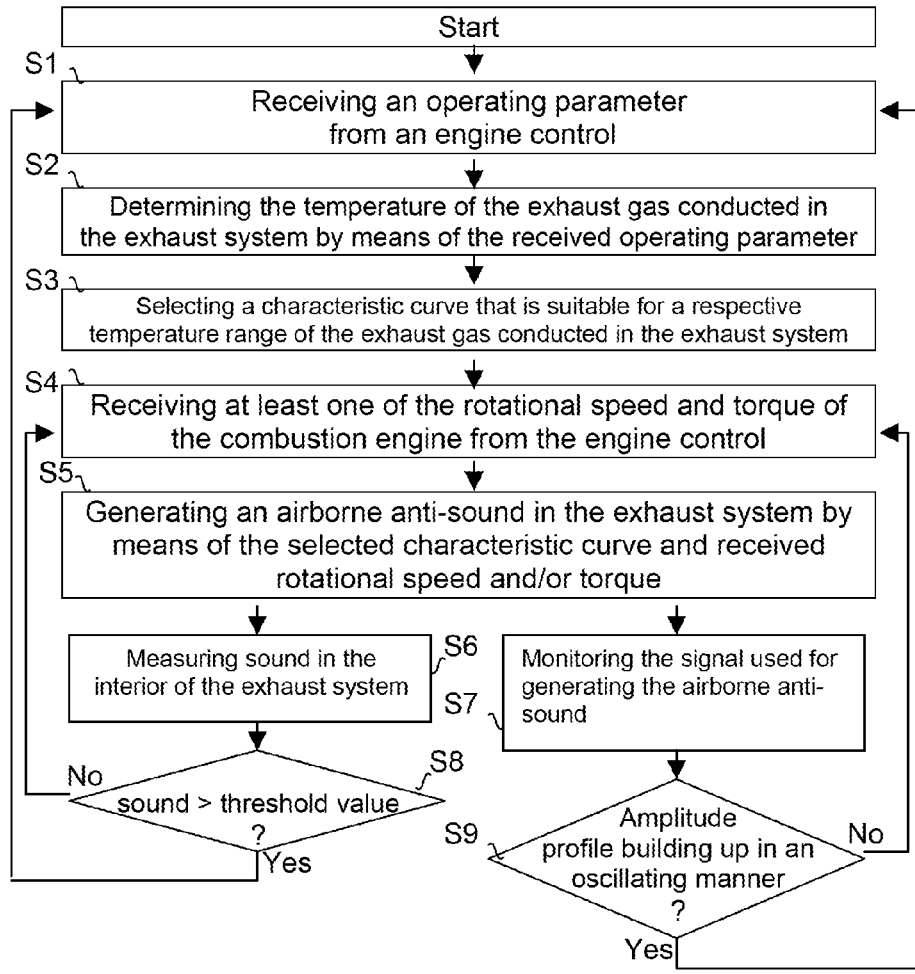
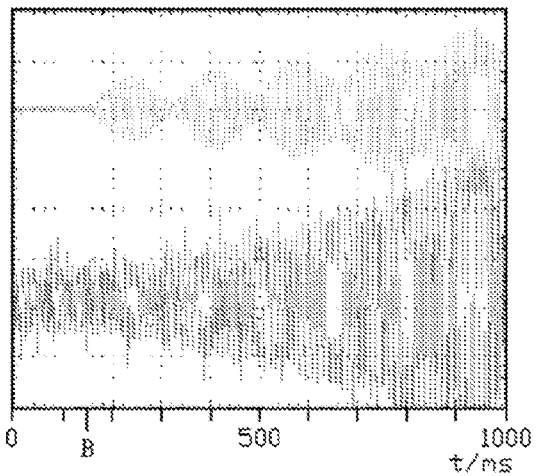

ACTIVE NOISE CONTROL SYSTEM FOR EXHAUST SYSTEMS AND METHOD FOR CONTROLLING THE SAME

CROSS-REFERENCES TO RELATED APPLICATIONS

The present application claims priority of Patent Application No. 10 2011 103 211.1 in Germany, entitled "ANTI-SOUND SYSTEM FOR EXHAUST SYSTEMS AND METHOD FOR CONTROLLING THE SAME", the content of which is hereby incorporated by reference in its entirety.

FIELD

The invention relates to an active noise control system for exhaust systems and a method for controlling the same. Thus, the present invention relates to at least one of an active cancellation and reduction and alteration of sound-waves in exhaust systems of combustion engine driven vehicles.

BACKGROUND

Regardless of the design of a combustion engine (for example reciprocating engine, pistonless rotary engine or free-piston engine), noises are generated because of the working cycles (in particular sucking-in and compressing a fuel-air mixture, ignition/expansion and exhausting the combusted fuel-air mixture) taking place in succession. These noises on the one hand pass through the combustion engine as solid-borne sound and are radiated off the outside of the combustion engine as airborne sound. On the other hand, the noises pass through an exhaust system of the combustion engine as airborne sound together with the combusted fuel-air mixture.

These noises are frequently perceived disadvantageous. On the one hand, there are legal stipulations for noise control, which have to be adhered to by manufacturers of vehicles driven by combustion engines. These legal stipulations as a rule specify a maximum permissible sound pressure during the operation of the vehicle. On the other hand, manufacturers attempt to impart a characteristic sound development on the combustion engine driven vehicles produced by them, which fit the image of the respective manufacturer and are to appeal to the customers. With modern engines including low cubic capacity, this characteristic noise development can frequently no longer be ensured in a natural way.

The noises passing through the combustion engine as solid-borne sound can be dampened with high efficiency and therefore usually do not constitute a problem regarding noise control.

The noises passing through an exhaust system of the combustion engine as airborne sound together with the combusted fuel-air mixture are conventionally reduced by silencers/mufflers arranged before the mouth of the exhaust system. If applicable, the silencers/mufflers are arranged downstream of existing catalytic converters. Such silencers/mufflers can for example operate according to the absorption and/or reflection principle. Silencers/mufflers constructed in accordance with either of these principles have the disadvantage that they require a comparatively large volume and put up a relatively high resistance to the combusted fuel-air mixture in case a high damping efficiency is required. Consequently, by using silencers/mufflers constructed in accordance with either of these principles the overall efficiency of the vehicle drops and the fuel consumption rises.

As alternative or to complement silencers/mufflers, so-called active noise control systems have been in development for some time, which superimpose electro acoustically generated anti-sound (sound wave with the same amplitude but with inverted phase (antiphase) to the noise to be cancelled) on the airborne sound generated by the combustion engine and conducted in the exhaust system. Such systems are known for example from the documents U.S. Pat. No. 4,177,874, U.S. Pat. No. 5,229,556, U.S. Pat. No. 5,233,137, U.S. Pat. No. 5,343,533, U.S. Pat. No. 5,336,856, U.S. Pat. No. 5,432,857, U.S. Pat. No. 5,600,106, U.S. Pat. No. 5,619,020, EP 0 373 188, EP 0 674 097, EP 0 755 045, EP 0 916 817, EP 1 055 804, EP 1 627 996, DE 197 51 596, DE 10 2006 042 224, DE 10 2008 018 085, DE 10 2009 031 848. By using an active noise control system as alternative or to complement silencers/mufflers, the construction volume of an exhaust system can be reduced by up to 60%, the weight can be reduced by up to 40% and the exhaust back pressure can be reduced by up to 150 mbar. The term anti-sound serves to distinguish from the airborne sound (noise) conducted in the exhaust system. Considered on its own, anti-sound is conventional airborne sound with the same amplitude but with inverted phase to the original sound (noise) to be cancelled.

A corresponding active noise control system is shown in the FIGS. 1 and 2 and can be procured from the company J. Eberspächer GmbH & Co. KG, Eberspächerstrasse 24, 73730 Esslingen, Germany.

FIG. 1 schematically shows a perspective view and FIG. 2 a block diagram of an active noise control system connected to an exhaust line.

As is evident from FIG. 1, both a sound generator 3' of an active noise control system as well as an exhaust pipe 4' fluidically connected to a combustion engine (in fluid communication with a combustion engine) lead into a tailpipe 1' in the region of an orifice 2' of an exhaust system. In the tailpipe 1', the airborne sound conducted in the exhaust pipe 4' together with the combusted fuel-air mixture is superimposed by anti-sound generated in the sound generator 3' of the active noise control system. To verify the effectiveness of the anti-sound, the tailpipe 1' comprises an error microphone 5'.

As is evident from FIG. 2, a catalytic converter 7' is provided between the combustion engine 6' and the exhaust pipe 4'. In addition, a temperature probe 9' connected to an engine control 8' for determining the exhaust gas temperature is arranged in the exhaust pipe 4'. The engine control 8' is connected to the combustion engine 6'. In the engine control 8', an anti-sound control 10' is integrated, which is connected to the error microphone 5' of the tailpipe 1' and to a loudspeaker 12' belonging to the sound generator 3' via an amplifier 11'.

For achieving a destructive interference of the sound waves of the airborne sound conducted in the exhaust pipe 4' and of the anti-sound generated in the sound generator 3' in the region of the tailpipe 1', the sound waves in the tailpipe 1' originating from the sound generator 3' have to correspond in shape and amount, to the sound waves conducted in the exhaust pipe 4', but have a phase shift of 180 degrees (inverted phase) relative to these. For controlling the loudspeaker 12', the anti-sound control 10' makes use of empirically (experimentally) determined characteristic curves, which take into account the transmission distance between loudspeaker 12' of the sound generator 3' and the error microphone 5' in the tailpipe 1' and indicate the signal to be output to the loudspeaker 12' as a function of a rotational speed of the combustion engine 6' received from the engine control 8'. Since the propagation velocity of sound between loudspeaker 12' and error microphone 5' is temperature-dependent, the characteristic curves are also temperature-dependent and thus only suitable for a defined (nominal) temperature range. The selection of the characteristic curve applicable to a temperature range is made by the anti-sound control 10' by means of the value measured by the temperature sensor 9'.

Thus, the anti-sound control 10' selects a characteristic curve that is suitable for this temperature range as a function of a value measured by the temperature sensor 9', from these characteristic curves, reads out values belonging to a respective engine rotational speed and by means of these values, outputs a corresponding signal to the loudspeaker 12' via the amplifier 11'. The success of the destructive sound wave superimposition is captured with the help of the error microphone 5'.

In the case of known active noise control systems it is disadvantageous that the compensation of the temperature dependency of the speed of sound between loudspeaker and error microphone is complicated.

SUMMARY

Embodiments of the present invention provide an active noise control system for exhaust systems and a method for controlling the same, which allow a compensation of a temperature-dependency in a simple manner.

Embodiments of an active noise control system for exhaust systems of a combustion engine-driven vehicle have an anti-sound control that can be connected to an engine control of the vehicle, and a loudspeaker, which is connected to the anti-sound control for receiving control signals. The connection between the anti-sound control and the loudspeaker can be provided for example by at least one of electrically and in sections via an air interface and in sections via a glass fibre. The loudspeaker is designed to generate anti-sound in a sound generator, which can be fluidically connected to the exhaust system (thus the internal space of the sound generator is in fluid communication with the internal space of the exhaust system). The sound generator can for example be a resonance chamber or a housing receiving the loudspeaker. The generation of the anti-sound by the loudspeaker is carried out as a function of a (in particular, electrical) control signal received by the anti-sound control. Here, an amplifier can be provided between the anti-sound control and the loudspeaker. In the anti-sound control, at least two characteristic curves are stored in order to at least partially and preferably completely cancel out in amount and phase airborne sound conducted in the exhaust system by generating anti-sound as a consequence of a control signal output to the loudspeaker. The characteristic curves stored in the anti-sound control cover different (nominal) temperature ranges of the exhaust gas conducted in the exhaust system. These temperature ranges overlap each other by pairs or immediately adjoin one another. By means of signals output by the engine control the anti-sound control selects the one characteristic curve that is suitable for a respective temperature of the exhaust gas conducted in the exhaust system from the available characteristic curves and outputs control signals to the loudspeaker making use of this characteristic curve.

According to embodiments, the temperature ranges of the characteristic curves stored in the anti-sound control comply to different states of the engine such as cold engine upon start, warm engine between start and regular use, and hot engine during regular use.

In this connection it is stressed that the characteristic curves can be more than two-dimensional. Practically, this means that the characteristic curves can base on tables having at least one of more than two columns respectively lines and complex numbers.

Thus, the anti-sound control is designed to indirectly determine a temperature of the exhaust gas conducted in the exhaust system by means of the control signals output by the engine control. The use of a separate temperature probe for determining the exhaust gas temperature is not required. Thus, the active noise control system allows a compensation of a temperature dependency in a particularly simple manner and also has a particularly simple and cost-effective construction. The problem of control-dead times involved with usage of temperature probes for determining the exhaust gas temperature, since the temperature of the exhaust gas conducted in the exhaust system adapts itself offset in time in the case of a load change, is also avoided through the anti-sound control.

According to an embodiment, the active noise control system furthermore comprises an error microphone, which is connected in particular electrically to the anti-sound control and can be arranged in the region of the fluid connection between sound generator and exhaust system in the exhaust system. "In the region of the fluid connection" here means that the error microphone is spaced from the fluid connection between sound generator and exhaust system with respect to the exhaust gas flow downstream or upstream by not more than 10 times, and in particular, not more than 5 times, and further particularly, not more than double the maximum of the cross section of the exhaust system on this fluid connection along the exhaust flow. The error microphone measures sound in the interior of the exhaust system and outputs a corresponding measurement signal to the anti-sound control. The anti-sound control compares the signals received from the error microphone with a threshold value in order to determine if a selected characteristic curve is suitable for a respective temperature of the exhaust gas conducted in the exhaust system. If the threshold value is exceeded, a change is made to another characteristic curve whose temperature range corresponds to the current temperature of the exhaust gas conducted in the exhaust system or is closest to this. The temperature of the exhaust gas conducted in the exhaust system is indirectly determined by means of the control signals output by the engine control.

In this manner, the usability of a characteristic curve just being used can be verified in a particularly simple manner.

According to an embodiment, the active noise control system furthermore comprises an error microphone, which is connected in particular electrically to the anti-sound control and can be arranged in the exhaust system in the region of the fluid connection between sound generator and exhaust system. "In the region of the fluid connection" here means that the error microphone is spaced from the fluid connection between sound generator and exhaust system with respect to the exhaust gas flow downstream or upstream along the exhaust flow by not more than 10 times and in particular not more than 5 times and further in particular by not more than 2 times the maximum cross section of the exhaust system at this fluid connection. The error microphone measures sound in the interior of the exhaust system and outputs a corresponding signal to the anti-sound control. By means of the signal received from the error microphone the anti-sound control determines, in particular through Fourier analysis, at least one of a rotational speed and a torque of the combustion engine. The determined rotational speed and/or the determined torque together with the selected characteristic curve are used by the anti-sound control in order to output control signals to the loudspeaker.

In this manner, a redundancy (for example for plausibility verification) to the values for rotational speed respectively torque received from the engine control can be achieved. Alternatively, the transmission of the rotational speed respectively torque from the engine control to the anti-sound control can also be omitted in this way. In an extreme case, the anti-sound control can work totally independently of the engine control and by means of the determined at least one of rotational speed and torque, rate a current temperature of the exhaust gas conducted in the exhaust system.

The error microphone can also be a pressure sensor, for example.

According to embodiments, the anti-sound control monitors the signal form of the control signal output to the loudspeaker with respect to amplitudes building up in an oscillating manner. If during the course of time amplitudes building up in an oscillating manner are determined, the anti-sound control recognises that a selected characteristic curve is not suitable for a respective temperature of the exhaust gas conducted in the exhaust system, and a change to another characteristic curve is made, whose temperature range corresponds to or is closest to the current temperature of the exhaust gas conducted in the exhaust system.

According to an embodiment, the anti-sound control selects the characteristic curve that is suitable for a respective temperature of the exhaust gas conducted in the exhaust system by means of at least one of a cooling water temperature and oil temperature and output signal of a lambda probe received from the engine control. An outside temperature received from the engine control can be additionally considered.

Such signals are frequently available without further ado in the engine control. Even independently of the active noise control system, temperature probes are frequently provided in the exhaust system of a vehicle in particular in the region of catalytic converters in order to measure the temperature of the exhaust gas conducted in a certain section of the exhaust gas flow. The section of the exhaust system in which these temperature probes are arranged, is spaced, in particular, from the section of the exhaust system in which the superimposition of the airborne sound conducted in the exhaust system with the anti-sound generated by the loudspeaker takes place.

According to an embodiment, the at least two characteristic curves each indicate a dependency of the control signals to be output to the loudspeaker on at least one of a rotational speed and a torque of the combustion engine for a respective predetermined temperature range.

According to an embodiment, the anti-sound control can be either connected to the engine control via a CAN bus or is integrated in the engine control.

According to embodiments, a motor vehicle comprises a combustion engine, an exhaust system which is in fluid connection with the combustion engine, an engine control, which is connected to the combustion engine (in particular, electrically) and an active noise control system as described above. Here, the anti-sound control is connected to the engine control or integrated in the latter, and the sound generator is connected to the exhaust system (and in particular in fluid communication with the exhaust system).

According to embodiments, a method for controlling an active noise control system for exhaust systems of a combustion engine driven vehicles comprises the steps of receiving of an operating parameter from an engine control, of determining of a respective temperature of the exhaust gas conducted in the exhaust system by means of the operating parameters received from the engine control, selecting of a characteristic curve suitable for a respective (nominal) temperature range of the exhaust gas conducted in the exhaust system from at least two characteristic curves, receiving of at least one of the rotational speed and the torque of the combustion engine from the engine control and generating of an anti-airborne sound in the exhaust system by means of the selected characteristic curve and received rotational speed and/or torque. In this manner, airborne sound conducted in the exhaust system and generated by a combustion engine can be cancelled at least partially and preferably completely in amount and phase. Here, the operating parameter indicates at least one of an outside temperature and a cooling water temperature and an oil temperature and an output signal of a lambda probe and a temperature of the exhaust gas conducted in the exhaust system. The at least two characteristic curves cover different nominal temperature ranges of the exhaust gas conducted in the exhaust system, which temperature ranges overlap one another by pairs or directly adjoin one another. The characteristic curves each reflect a dependency of a control signal causing a destructive interference with airborne sound conducted in the exhaust system on at least one of rotational speed and torque of the combustion engine for a respective, predetermined temperature range.

According to embodiments, the different nominal temperature ranges of the characteristic curves comply to different states of the engine such as cold engine upon start, warm engine between start and regular use, and hot engine during regular use.

According to an embodiment, the method additionally comprises the steps of the measuring of sound in the interior of the exhaust system in the region of the location in the exhaust system, in which the airborne anti-sound is superimposed with the combustion engine airborne sound, the comparing of the measured sound with a preset threshold value and the changing of the characteristic curve when the threshold value is exceeded.

According to an embodiment, the method further comprises the steps of measuring of sound in the interior of the exhaust system in a region of the location in the exhaust system, in which the airborne anti-sound is superimposed with the combustion engine airborne sound and determining of at least one of rotational speed and torque of the combustion engine by means of the measured sound in particular through Fourier analysis. This is followed by the step of generating the airborne anti-sound in the exhaust system by means of the selected characteristic curve and determined rotational speed and/or torque.

According to an embodiment, the method furthermore comprises the steps of monitoring of the time profile of the amplitude of the control signal used for generating the anti-sound and the changing of the characteristic curve when the amplitude has a profile that builds up in an oscillating manner.

Instead of the rotational speed and/or of the torque, the at least two characteristic curves each can indicate for a nominal temperature range a dependency of the control signal to be output to the loudspeaker on a signal received from the engine control that is representative for certain states of the combustion engine other than the rotational speed and/or a torque, such as for example the ignition frequency of the combustion engine.

In this connection, it is emphasised that in this publication, unless individually explicitly stated otherwise, the term "controlling" is used to cover both open loop control and closed loop control.

Additionally it is pointed out that the terms "comprising", "having", "containing", "including" and "with" as well as their grammatic permutations generally have to be understood as non-concluding enumeration of features, such as for example method steps, elements, regions, variables and the like and in no way exclude the presence of other or additional features or groupings of other or additional features.

BRIEF DESCRIPTION OF THE DRAWINGS

The forgoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

It is pointed out that the invention is not restricted to the embodiments of the described exemplary embodiments, but is defined by the scope of the enclosed patent claims. In particular, the individual features including embodiments according to the invention can be realised in another quantity and combination than with the examples mentioned below. With the following explanation of some exemplary embodiments of the invention, reference is made to the enclosed Figures, of which FIG. 1 schematically shows a perspective view of an active noise control system of the prior art, FIG. 2 schematically shows a block diagram of the active noise control system from FIG. 1 in interaction with an exhaust system of a combustion engine, FIG. 3 schematically shows a perspective view of an active noise control system according to an embodiment of the invention, FIG. 4 schematically shows a block diagram of the active noise control system from FIG. 3 in interaction with an exhaust system of a combustion engine, FIG. 5 shows a flow diagram of a method for controlling an active noise control system for exhaust system, and FIG. 6 shows amplitudes of a control signal output to a loudspeaker which build up in an oscillating manner over the course of time.

DETAILED DESCRIPTION OF EXEMPLARY EMBODIMENTS

Figure 1:
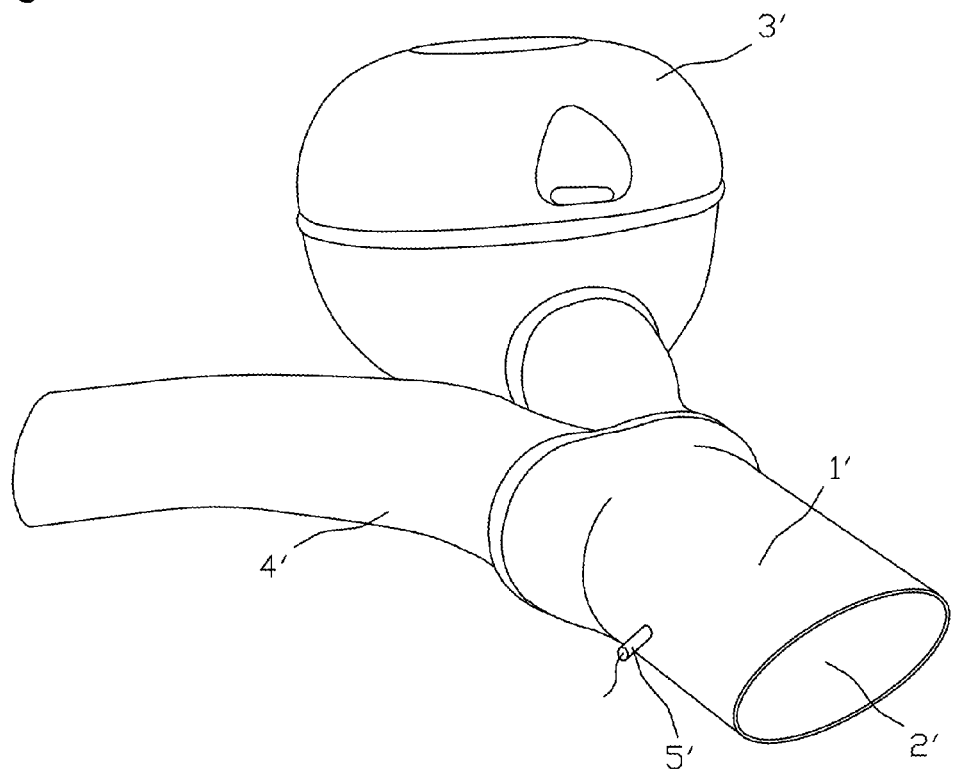
Figure 2:
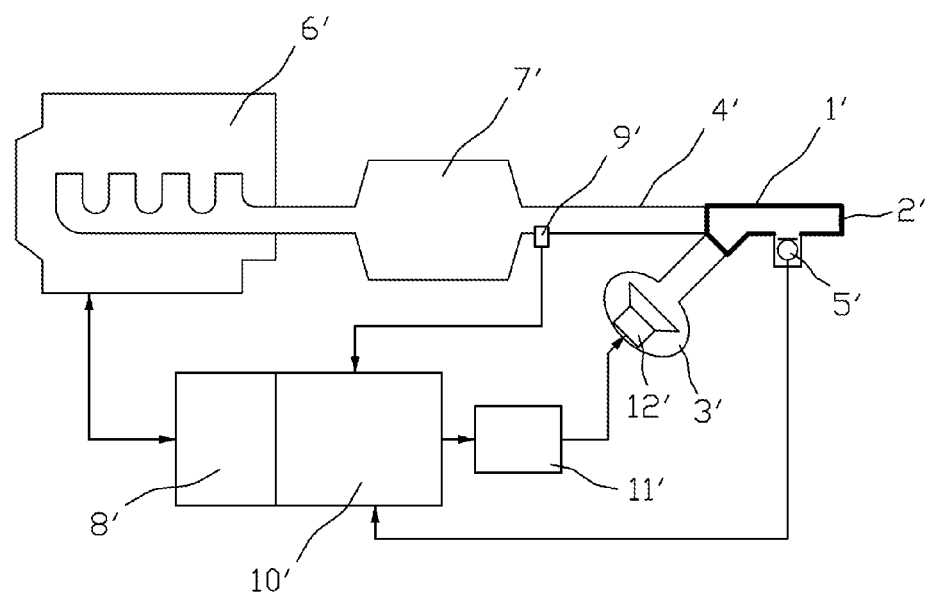

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

Figure 3:
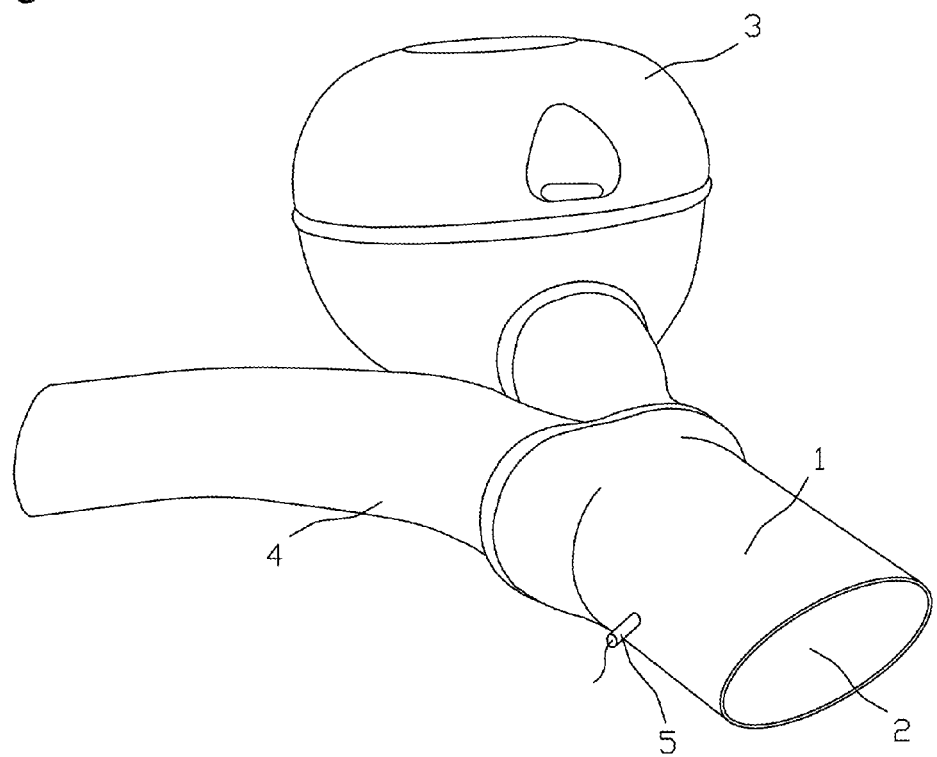
Figure 4:
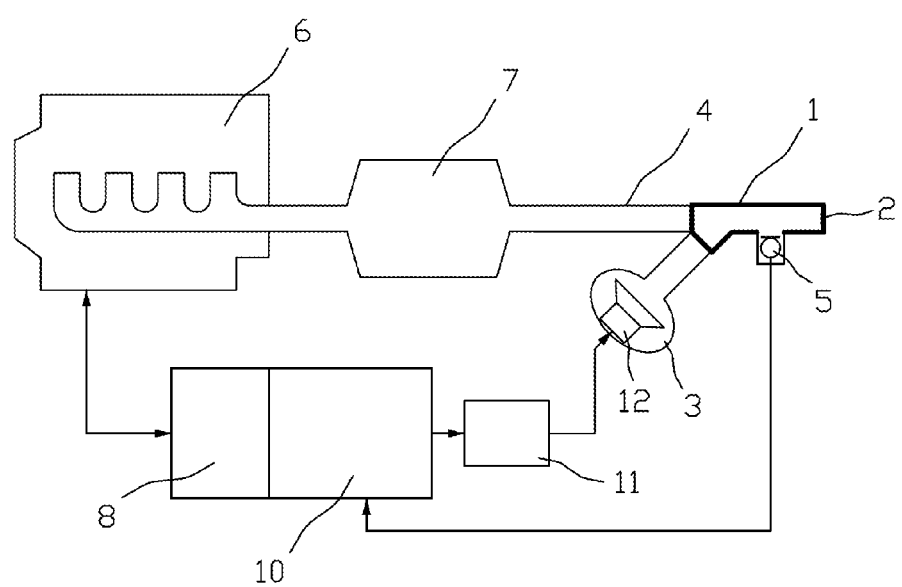

An active noise control system according to an embodiment of the invention is described in the following making reference to the FIGS. 3 and 4.

The active noise control system comprises a sound generator 3 in the form of a sound-insulated housing, which contains a loudspeaker 12 and is fluidically connected to an exhaust system 4 in the region of a tailpipe 1.

The tailpipe 1 has an orifice 2 in order to discharge exhaust gas conducted in the exhaust system 4 to the outside.

On the tailpipe 1, an error microphone 5 in the form of a pressure sensor is provided. The error microphone 5 measures pressure fluctuations and thus sound in the interior of the tailpipe 1 in a section downstream of a region, in which the fluid connection between exhaust system 4 and sound generator 3 is provided, and thus in a region in the exhaust system 4, in which the airborne anti-sound is superimposed with the combustion engine airborne sound. Alternatively, the error microphone 5 can also be located and thus measure the pressure fluctuations in the interior of the tailpipe 1 in a section upstream of the region in which the fluid connection between exhaust system 4 and sound generator 3 is provided, or exactly in the region in which the fluid connection between exhaust system 4 and sound generator 3 is provided. The later situation is not shown in the figures.

The loudspeaker 12 and the error microphone 5 are electrically connected to an anti-sound control 10. In the embodiment shown in FIG. 4 the anti-sound control 10 is unitarily formed with an engine control 8 and thus integrated into the engine control 8. An amplifier 11 is provided between the anti-sound control 10 and the loudspeaker 12.

In the shown embodiment, the exhaust system 4 furthermore comprises a catalytic converter 7 arranged between a combustion engine 6 and the tailpipe 1 for cleaning the exhaust gas emitted by the combustion engine 6 and conducted in the exhaust system 4. The combustion engine 6 is controlled by and electrically connected to the engine control 8.

In the present embodiment three characteristic curves are stored in the anti-sound control 10, in order to at least partially cancel in amount and phase airborne sound conducted in the exhaust system 4 through the anti-sound generated by the loudspeaker 12 following the output of the control signal to the loudspeaker 12. These characteristic curves in each case cover different but partially overlapping temperature ranges of the exhaust gas conducted in the exhaust system 4. Furthermore, these characteristic curves in each case indicate a dependency of a control signal for the loudspeaker 12 causing a destructive interference with airborne sound conducted in the exhaust system 4 on a rotational speed of the combustion engine. A first characteristic curve covers low exhaust gas temperatures, a second characteristic curve covers medium exhaust gas temperatures and a third characteristic curve covers high exhaust gas temperatures. In the shown example, the characteristic curves in each case are three-dimensional, i.e. they have three columns. The present invention however is not restricted to this. Thus, the characteristic curves can each have two or more than two dimensions/columns and/or complex numbers.

In the present embodiment, the first, second and third characteristic curves covering low, medium and high exhaust gas temperatures additionally comply to different states of combustion engine 6 such as cold engine (upon start), warm engine (short use of engine) and hot engine (stable use of engine).

The mode of operation of the above active noise control system is explained in more detail in the following making reference to the flow diagram from FIG. 5.

In a first step S1, the anti-sound control 10 receives a plurality of operating parameters of the combustion engine 6 from the engine control 8. In the present embodiment these operating parameters are the outside temperature of the vehicle and the cooling water temperature of the combustion engine 6 and oil temperature of the combustion engine 6.

From these values, the anti-sound control 10 assesses the temperature of the exhaust gas conducted in the exhaust system in the following step S2.

Following this, the anti-sound control 10 in step S3 selects the characteristic curve that is best suited for the temperature of the exhaust gas conducted in the exhaust system determined in step S2. For example, high cooling water and oil temperatures point to stable use of the engine and a stable high exhaust gas temperature. Low cooling water and oil temperatures point to a cold engine that has just been started and a low exhaust gas temperature; however, raising of the exhaust gas temperature is to be expected. High cooling water and low oil temperatures give rise to the conclusion that the combustion engine 6 has not been running for a long time and the exhaust gas temperature therefore are in the medium range; raising of the exhaust gas temperature is to be expected.

The rotational speed of the combustion engine 6 is read out of the engine control 8 through the anti-sound control 10 in the following step S4.

Following this, the anti-sound control 10 outputs the control signal read out of the characteristic curve for the actual rotational speed of the combustion engine in step S5 via the amplifier 11 to the loudspeaker 12. Because of this, the airborne sound generated by the combustion engine 6 is superimposed in the region of the tailpipe 1 of the exhaust system 4 by the anti-sound generated by the loudspeaker 12. The anti-sound cancels the airborne sound generated by the combustion engine 6 and conducted in the exhaust system 4 at least partially in amount and phase.

The mode of operation of the anti-sound control 10 is monitored in the steps S6 and S8 in parallel to steps S7 and S9.

In step S6, the error microphone 5 measures sound in the interior of the tailpipe 1 downstream of the location in the exhaust system 4, in which the airborne anti-sound is superimposed with the combustion engine airborne sound and outputs a corresponding measurement value to the anti-sound control 10.

Following this, the anti-sound control 10 in step S8 compares the amplitude of the sound measured by the error microphone 5 with a predetermined threshold value. If the threshold value is exceeded, the method continues with step S1 in order to search for a new characteristic curve that is better suited. If, other than in the present embodiment, only two characteristic curves are provided for two adjacent or overlapping temperature ranges of the exhaust gas conducted in the exhaust system, the method does not continue with step S1 but with step S4 and simply changes to the other characteristic curve.

In parallel with this, the anti-sound control 10 monitors the time profile of the amplitude of the control signal output to the loudspeaker 12 for generating the anti-sound in step S7.

If the anti-sound control 10 in step S9 recognises that the amplitude has a profile that is building up in an oscillating manner, the method continues with step S1 in order to search for a new characteristic curve that is better suited. If, other than in the present embodiment, only two characteristic curves are provided for two adjacent or overlapping temperature ranges of the exhaust gas conducted in the exhaust system, the method simply changes to the other characteristic curve and continues not with step S1, but with step S4.

A profile of the amplitude of the control signal output to the loudspeaker 12 by the anti-sound control 10 which builds up in an oscillating manner is shown in the upper part of FIG. 6 for the time to the right of the point of time B.

In the lower part of FIG. 6, the sound measured by the error microphone 5 is shown. While the airborne sound generated by the combustion engine 6 is largely cancelled in amount and phase by the anti-sound generated by the loudspeaker 12 up to/left of the point of time B, this is no longer the case to the right of the point of time B.

In the present embodiment, in another operating mode the anti-sound control 10 is further designed to determine the rotational speed of the combustion engine 6 in sound measured by the error microphone 5 through Fourier analysis. Reading out the rotational speed from the engine control 8 is therefore not required in this operating mode. Determining the engine rotational speed through Fourier analysis must thus be seen as alternative to step S4 in FIG. 5. The remaining setup of FIG. 5 remains unchanged. In the same manner, the torque of the combustion engine 6 can also be determined through Fourier analysis.

In the above Figures, for the sake of clear representation, only those elements, components and functions are shown which promote an understanding of the present invention. Embodiments of the invention however are not restricted to the elements, components and functions shown, but include further elements, components and functions insofar as these are required for their use or their scope of operation.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

The invention claimed is:

1. An active noise control system for an exhaust system of a combustion engine operated vehicle, comprising:
    an anti-sound control, which can be connected to an engine control of the vehicle; and
    a loudspeaker, which is connected to the anti-sound control for receiving control signals, wherein the loudspeaker is adapted to generate an anti-sound in a sound generator in response to a control signal received from the anti-sound control, wherein the sound generator can be fluidically connected to the exhaust system;
    wherein in the anti-sound control at least two characteristic curves are stored in order to at least partially cancel airborne sound conducted in the exhaust system by outputting the control signal to the loudspeaker, which characteristic curves cover different temperature ranges of the exhaust gas conducted in the exhaust system, which temperature ranges overlap one another by pairs or directly adjoin one another; and
    wherein the anti-sound control is further adapted to select a characteristic curve that is suitable for a respective temperature of the exhaust gas conducted in the exhaust system from the available characteristic curves by means of signals output by the engine control and to output control signals to the loudspeaker derived from the selected characteristic curve;
    the active noise control system further comprising:
    an error microphone, which is connected to the anti-sound control and can be arranged in a location of the exhaust system in the region of the fluid connection between sound generator and exhaust system, wherein the error microphone is adapted to measure sound in the interior of the exhaust system and to output a corresponding measurement signal to the anti-sound control;
    wherein the anti-sound control is adapted to determine by means of signals received from the error microphone through comparison with a threshold value if a selected characteristic curve is suitable for a respective temperature of the exhaust gas conducted in the exhaust system.

2. The active noise control system according to claim 1, wherein the anti-sound control is adapted to select a characteristic curve that is suitable for the respective temperature of the exhaust gas conducted in the exhaust system based on at least one of cooling water temperature received from the engine control and oil temperature received from the engine control and output signal of a lambda probe and outside temperature.

3. The active noise control system according to claim 2, wherein the at least two characteristic curves in each case state a dependency of the control signal to be output to the loudspeaker on at least one of rotational speed and torque of the combustion engine for a respective predetermined temperature range.

4. The active noise control system according to claim 1, wherein the at least two characteristic curves in each case state a dependency of the control signal to be output to the loudspeaker on at least one of rotational speed and torque of the combustion engine for a respective predetermined temperature range.

5. The active noise control system according to claim 1, wherein the anti-sound control can be either connected to the engine control via a CAN bus or is integrated in the engine control.

6. The active noise control system according to claim 1, wherein the anti-sound control is adapted to determine, by means of the signal shape of the control signals output to the loudspeaker by recognising amplitudes which build up in an oscillating manner over the course of time that a selected characteristic curve is not suitable for a respective temperature of the exhaust gas conducted in the exhaust system.

7. The active noise control system according to claim 1, wherein the anti-sound control is adapted to select a characteristic curve that is suitable for the respective temperature of the exhaust gas conducted in the exhaust system based on at least one of cooling water temperature received from the engine control and oil temperature received from the engine control and output signal of a lambda probe and outside temperature.

8. The active noise control system according to claim 7, wherein the at least two characteristic curves in each case state a dependency of the control signal to be output to the loudspeaker on at least one of rotational speed and torque of the combustion engine for a respective predetermined temperature range.

9. The active noise control system according to claim 1, wherein the at least two characteristic curves in each case state a dependency of the control signal to be output to the loudspeaker on at least one of rotational speed and torque of the combustion engine for a respective predetermined temperature range.

10. An active noise control system for an exhaust system of a combustion engine operated vehicle, comprising:
   an anti-sound control, which can be connected to an engine control of the vehicle; and
   a loudspeaker, which is connected to the anti-sound control for receiving controls signals, wherein the loudspeaker is adapted to generate an anti-sound in a sound generator in response to a control signal received from the anti-sound control, wherein the sound generator can be fluidically connected to the exhaust system;
   wherein the anti-sound control at least two characteristic curves are stored in order to at least partially cancel airborne sound conducted in the exhaust system by outputting the control signal to the loudspeaker, which characteristic curves cover different temperature ranges of the exhaust gas conducted in the exhaust system, which temperature ranges overlap one another by pairs or directly adjoin one another; and
   wherein the anti-sound control is further adapted to select a characteristic curve that is suitable for a respective temperature of the exhaust gas conducted in the exhaust system from the available characteristic curves by means of signals output by the engine control and to output control signals to the loudspeaker derived from the selected characteristic curve;
   the active noise control system further comprising:
   an error microphone which is connected to the anti-sound control and can be arranged in a location of the exhaust line in the region of the fluid connection between sound generator and exhaust line, wherein the error microphone is designed to measure sound in the interior of the exhaust line and to output a corresponding measurement signal to the anti-sound control;
   wherein the anti-sound control is adapted to determine at least one of rotational speed and torque of the combustion engine by means of the signal received from the error microphone in particular through Fourier analysis and to output control signals to the loudspeaker making use of the selected characteristic curve and determined rotational speed and/or torque.

11. The active noise control system according to claim 10, wherein the anti-sound control is adapted to determine, by means of the signal shape of the control signals output to the loudspeaker by recognising amplitudes which build up in an oscillating manner over the course of time that a selected characteristic curve is not suitable for a respective temperature of the exhaust gas conducted in the exhaust system.

12. The active noise control system according to claim 10, wherein the anti-sound control is adapted to select a characteristic curve that is suitable for the respective temperature of the exhaust gas conducted in the exhaust system based on at least one of cooling water temperature received from the engine control and oil temperature received from the engine control and output signal of a lambda probe and outside temperature.

13. The active noise control system according to claim 12, wherein the at least two characteristic curves in each case state a dependency of the control signal to be output to the loudspeaker on at least one of rotational speed and torque of the combustion engine for a respective predetermined temperature range.

14. The active noise control system according to claim 10, wherein the at least two characteristic curves in each case state a dependency of the control signal to be output to the loudspeaker on at least one of rotational speed and torque of the combustion engine for a respective predetermined temperature range.

15. An active noise control system for an exhaust system of a combination engine operated vehicle, comprising:
   an anti-sound control, which can be connected to an engine control of the vehicle; and
   a loudspeaker, which is connected to the anti-sound control for receiving control signals, wherein the loudspeaker is adapted to generate an anti-sound in a sound generator in response to a control signal received from the anti-sound control, wherein the sound generator can be fluidically connected to the exhaust system;
   wherein the anti-sound control at least two characteristic curves are stored in order to at least partially cancel airborne sound conducted in the exhaust system by outputting the control signal to the loudspeaker, which characteristic curves cover different temperature ranges of the exhaust gas conducted in the exhaust system, which temperature ranges overlap on another by pairs or directly adjoin one another, and
   wherein the anti-sound control is further adapted to select a characteristic curve that is suitable for a respective temperature of the exhaust gas conducted in the exhaust system from the available characteristic curves by means of signals output by the engine control and to output control signals to the loudspeaker derived from the selected characteristic curve;

wherein the anti-sound control is adapted to determine, by means of the signal shape of the control signals output to the loudspeaker by recognizing amplitudes which build up in an oscillating manner over the course of time that a selected characteristic curve is not suitable for a respective temperature of the exhaust gas conducted in the exhaust system.

16. A method for controlling an active noise control system for exhaust systems of a combustion engine operated vehicle, comprising the following steps:
receiving an operating parameter form an engine control, wherein the operating parameter indicates at least one of cooling water temperature and oil temperature and output signal of a lambda probe and outside temperature;
determining the temperature of the exhaust gas conducted in the exhaust system by means of the operating parameter received from the engine control;
selecting a characteristic curve that is suitable for a respective temperature of the exhaust gas conducted in the exhaust system from at least two characteristic curves, which characteristic curves cover different temperature ranges of the exhaust gas conducted in the exhaust system, which temperature ranges overlap one another by pairs or directly adjoin one another, wherein the characteristic curves in each case reflect a dependency of a control signal causing a destructive interference with airborne sound conducted in the exhaust system on at least one of a rotational speed and a torque of the combusting engine for a respective, predetermined temperature range;
receiving the rotational speed and/or the torque of the combustion engine from the engine control;
generating an anti-airborne sound in the exhaust system by means of the selected characteristic curve and received rotational speed and/or torque in order to at least partially cancel airborne sound generated by a combustion engine and conducted in the exhaust system;
measuring sound in the interior of the exhaust system in the region of the location in the exhaust system, in which the anti-airborne sound is superimposed with the combustion engine airborne sound;
comparing the measured sound with a preset threshold value; and
changing the characteristic curve when the threshold value is exceeded.

17. The method according to claim 16, furthermore comprising:
measuring sound in the interior of the exhaust system in the region of the location in the exhaust system, in which the anti-airborne sound is superimposed with the combustion engine airborne sound; and
determining at least one of rotational speed and torque of the combustion engine by means of the measured sound in particular through Fourier analysis;
wherein the step of generating the airborne anti-sound in the exhaust system is carried out by means of the selected characteristic curve and determined rotational speed and/or torque.

18. The method according to claim 17, furthermore comprising:
monitoring the time profile of the amplitude of the control signal used for generating the anti-sound; and
changing the characteristic curve when the amplitude comprises a profile that builds up in an oscillating manner.

19. The method according to claim 16, furthermore comprising:
monitoring the time profile of the amplitude of the control signal used for generating the anti-sound; and
changing the characteristic curve when the amplitude comprises a profile that builds up in an oscillating manner.

20. The method according to claim 16, furthermore comprising:
measuring sound in the interior of the exhaust system in the region of the location in the exhaust system, in which the anti-airborne sound is superimposed with the combustion engine airborne sound; and
determining at least one of rotational speed and torque of the combustion engine by means of the measured sound in particular through Fourier analysis;
wherein the step of generating the airborne anti-sound in the exhaust system is carried out by means of the selected characteristic curve and determined rotational speed and/or torque.

21. The method according to claim 20, furthermore comprising:
monitoring the time profile of the amplitude of the control signal used for generating the anti-sound; and
changing the characteristic curve when the amplitude comprises a profile that builds up in an oscillating manner.

22. The method according to claim 16, furthermore comprising:
monitoring the time profile of the amplitude of the control signal used for generating the anti-sound; and
changing the characteristic curve when the amplitude comprises a profile that builds up in an oscillating manner.

23. A motor vehicle comprising:
a combustion engine;
an exhaust system, which is fluidically connected to the combustion engine;
an engine control which is connected to the combustion engine; and
an active noise control system according to claim 1, wherein the anti-sound control is connected to the engine control or integrated in the latter, and the sound generator is connected to the exhaust system.

24. A motor vehicle comprising:
a combustion engine;
an exhaust system, which is fluidically connected to the combustion engine;
an engine control which is connected to the combustion engine; and
an active noise control system according to claim 10, wherein the anti-sound control is connected to the engine control or integrated in the latter, and the sound generator is connected to the exhaust system.

* * * * *